Figure 1:
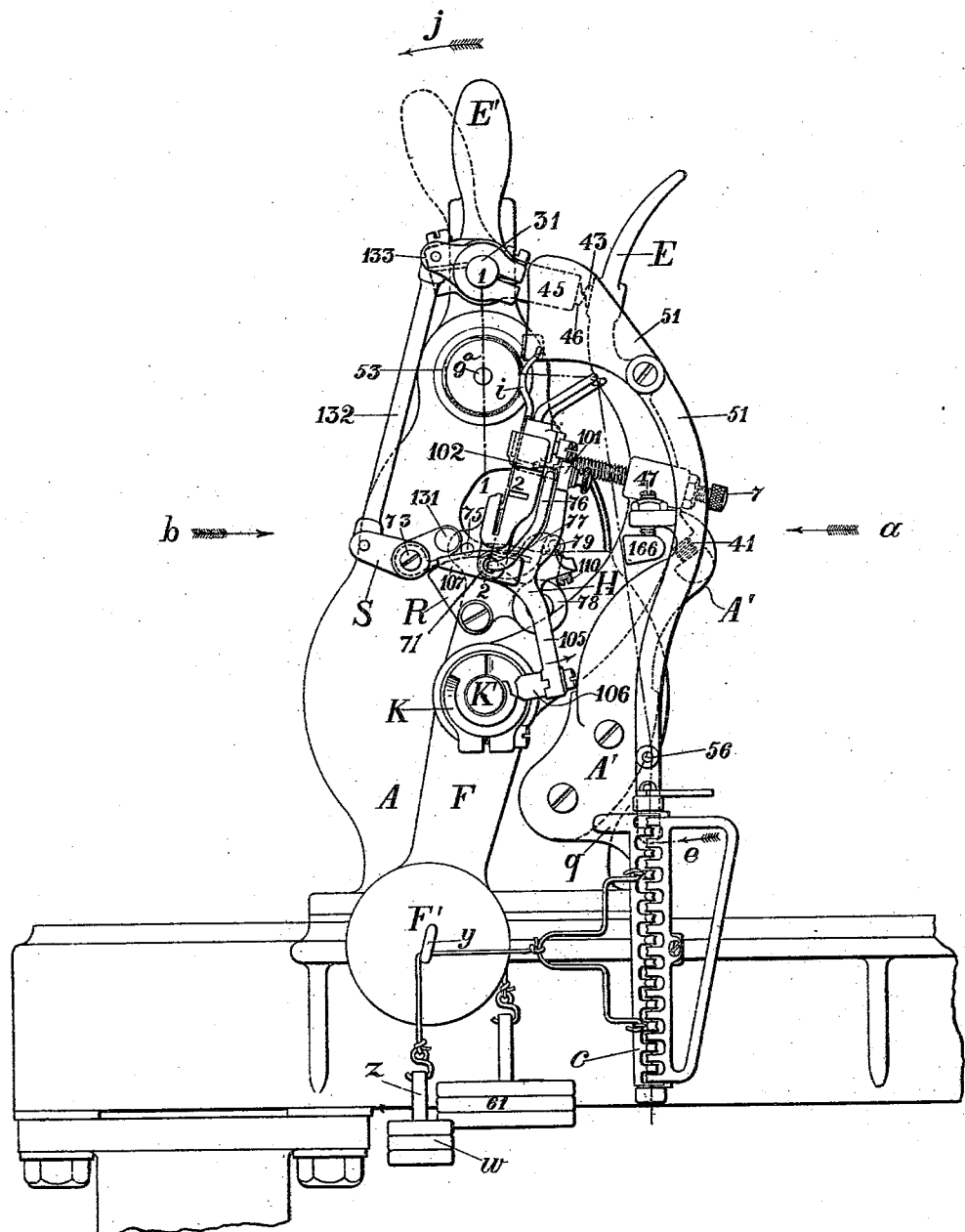

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 1.

WITNESSES

INVENTOR
Simon W. Wardwell
BY
ATTORNEYS

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 3.

WITNESSES
H. M. Gillman, Jr.
A. E. Hansmann.

INVENTOR
Simon W. Wardwell
BY
Foster Freeman
ATTORNEYS

No. 690,492. Patented Jan. 7, 1902.
S. W. WARDWELL.
MACHINE FOR WINDING COMPOSITE COPS.
(Application filed Nov. 19, 1900.)

(No Model.) 12 Sheets—Sheet 4.

WITNESSES

INVENTOR
ATTORNEYS

No. 690,492. Patented Jan. 7, 1902.
S. W. WARDWELL.
MACHINE FOR WINDING COMPOSITE COPS.
(Application filed Nov. 19, 1900.)

(No Model.) 12 Sheets—Sheet 5.

WITNESSES

INVENTOR

BY

ATTORNEYS.

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 6.

WITNESSES

INVENTOR
Simon W. Wardwell
BY
ATTORNEYS

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 7.

WITNESSES
INVENTOR
Simion W. Wardwell
BY
ATTORNEYS

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 8.

WITNESSES
INVENTOR
Simon W. Wardwell
BY
ATTORNEYS

No. 690,492. Patented Jan. 7, 1902.
S. W. WARDWELL.
MACHINE FOR WINDING COMPOSITE COPS.
(Application filed Nov. 19, 1900.)
(No Model.) 12 Sheets—Sheet 9.
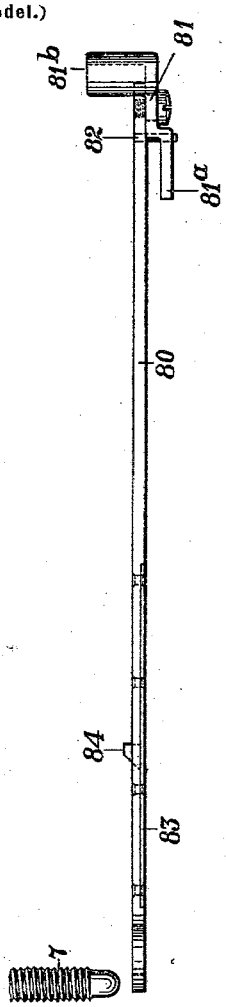
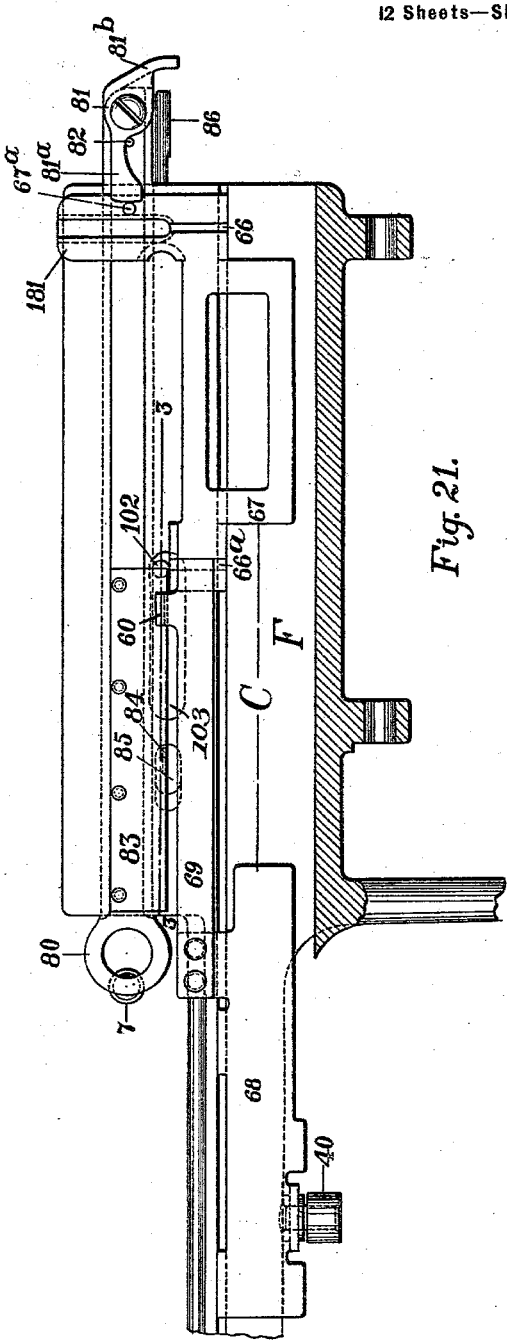

No. 690,492. Patented Jan. 7, 1902.
S. W. WARDWELL.
MACHINE FOR WINDING COMPOSITE COPS.
(Application filed Nov. 19, 1900.)
(No Model.)
12 Sheets—Sheet 10.

WITNESSES

INVENTOR
Simon W. Wardwell
BY
ATTORNEYS

THE NORRIS PETERS CO., PHOTO-LITHO., WASHINGTON, D. C.

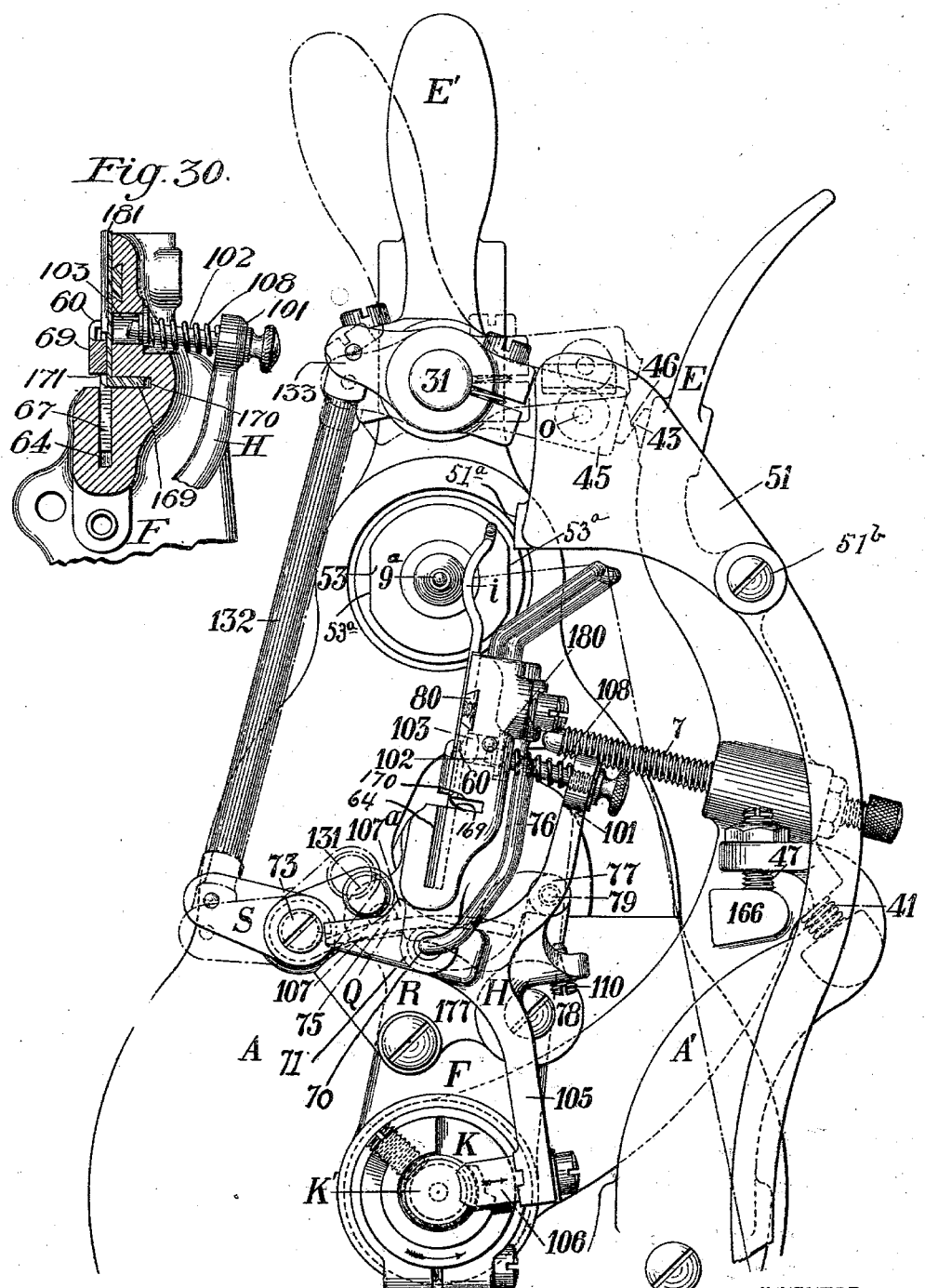

UNITED STATES PATENT OFFICE.

SIMON W. WARDWELL, OF PROVIDENCE, RHODE ISLAND, ASSIGNOR TO UNIVERSAL WINDING COMPANY, OF PORTLAND, MAINE, A CORPORATION OF MAINE.

MACHINE FOR WINDING COMPOSITE COPS.

SPECIFICATION forming part of Letters Patent No. 690,492, dated January 7, 1902.

Application filed November 19, 1900. Serial No. 37,013. (No model.)

*To all whom it may concern:*

Be it known that I, SIMON W. WARDWELL, a citizen of the United States, residing at Providence, in the county of Providence and State of Rhode Island, have invented certain new and useful Improvements in Machines for Winding Composite Cops, of which the following is a specification.

This invention relates particularly to the class of winding-machines, known as "quillers" or "quill-winders," employed to wind cops or packages for use in loom-shuttles and also to that type of winding-machine designed to wind various materials by the system known to those versed in the art as the "V" or "universal" wind.

My invention consists of means whereby to economically produce a novel composite cop composed of a plurality—two or more—of component cops, each preferably wound by the V-wind and all wound from one continuous thread upon one common tube.

Further, my invention consists of certain details of construction and appliances, fully set forth hereinafter and illustrated in the accompanying drawings, in which—

Figure 2:
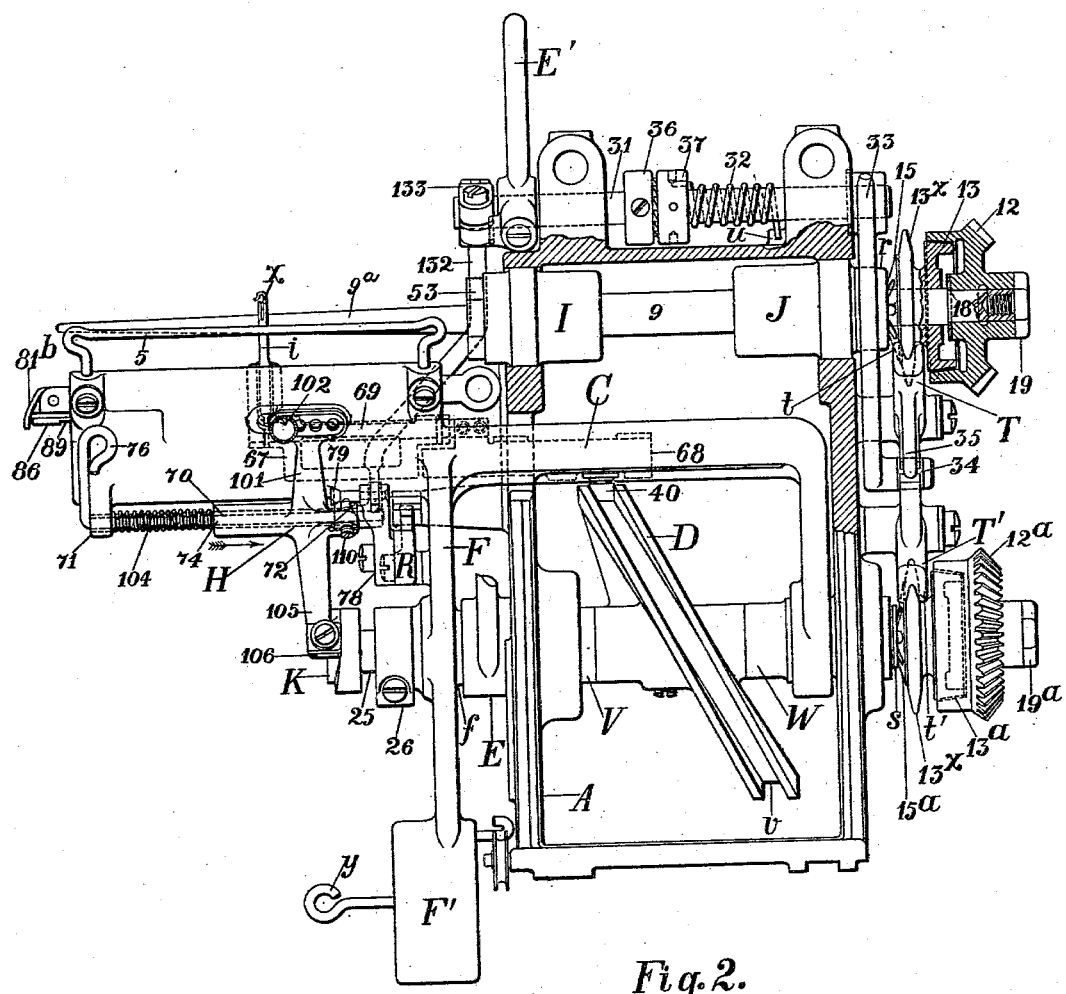
Figure 9:
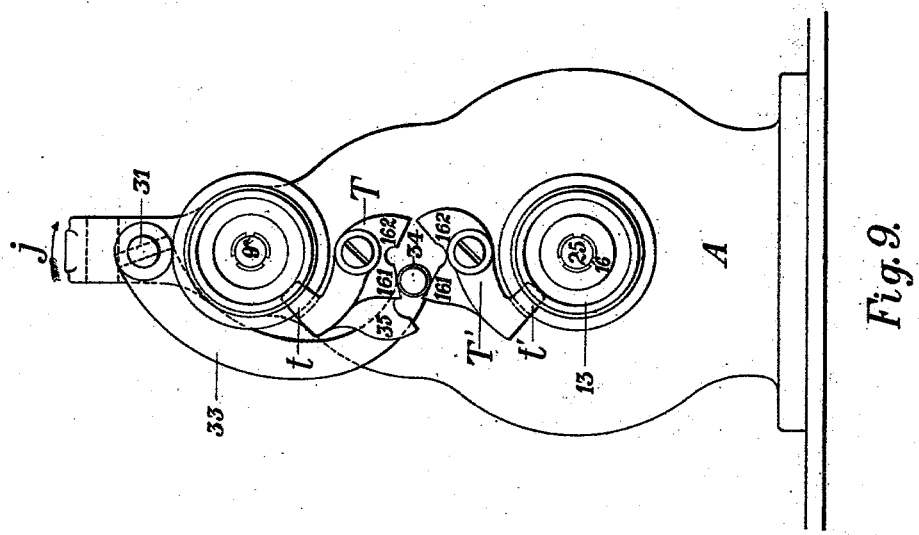
Figure 3:
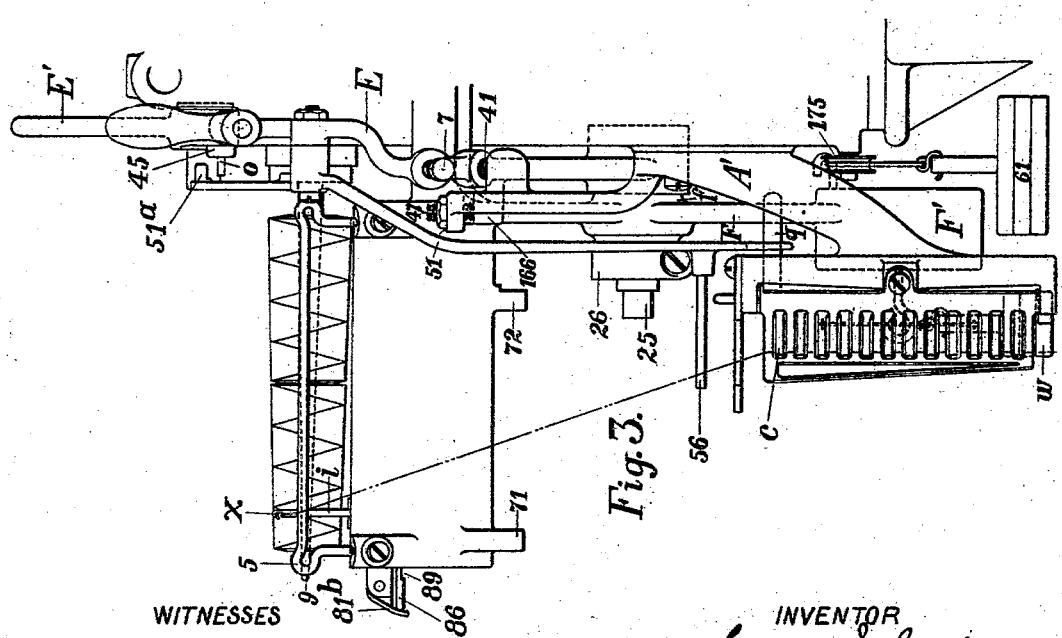
Figure 4:
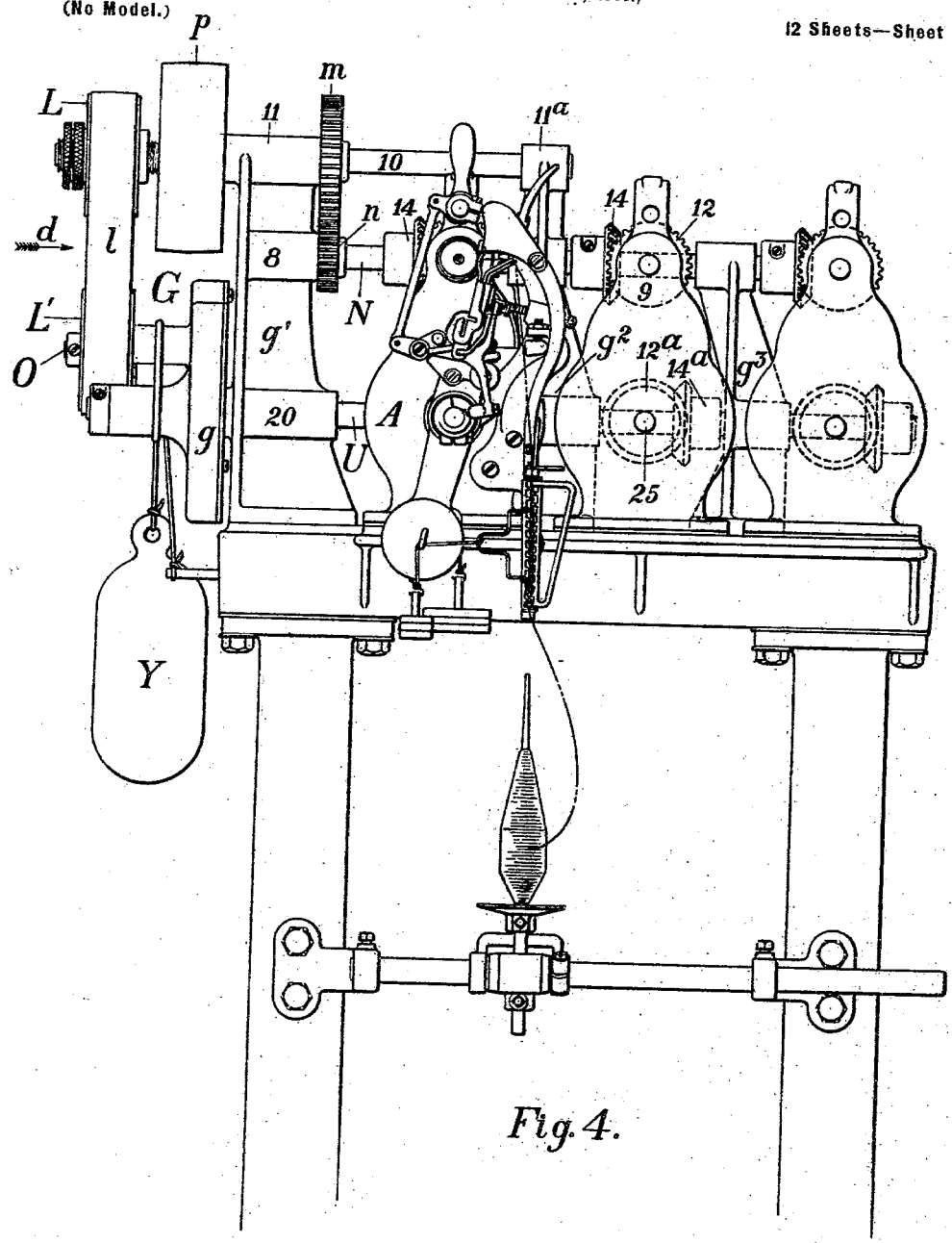
Figure 5:
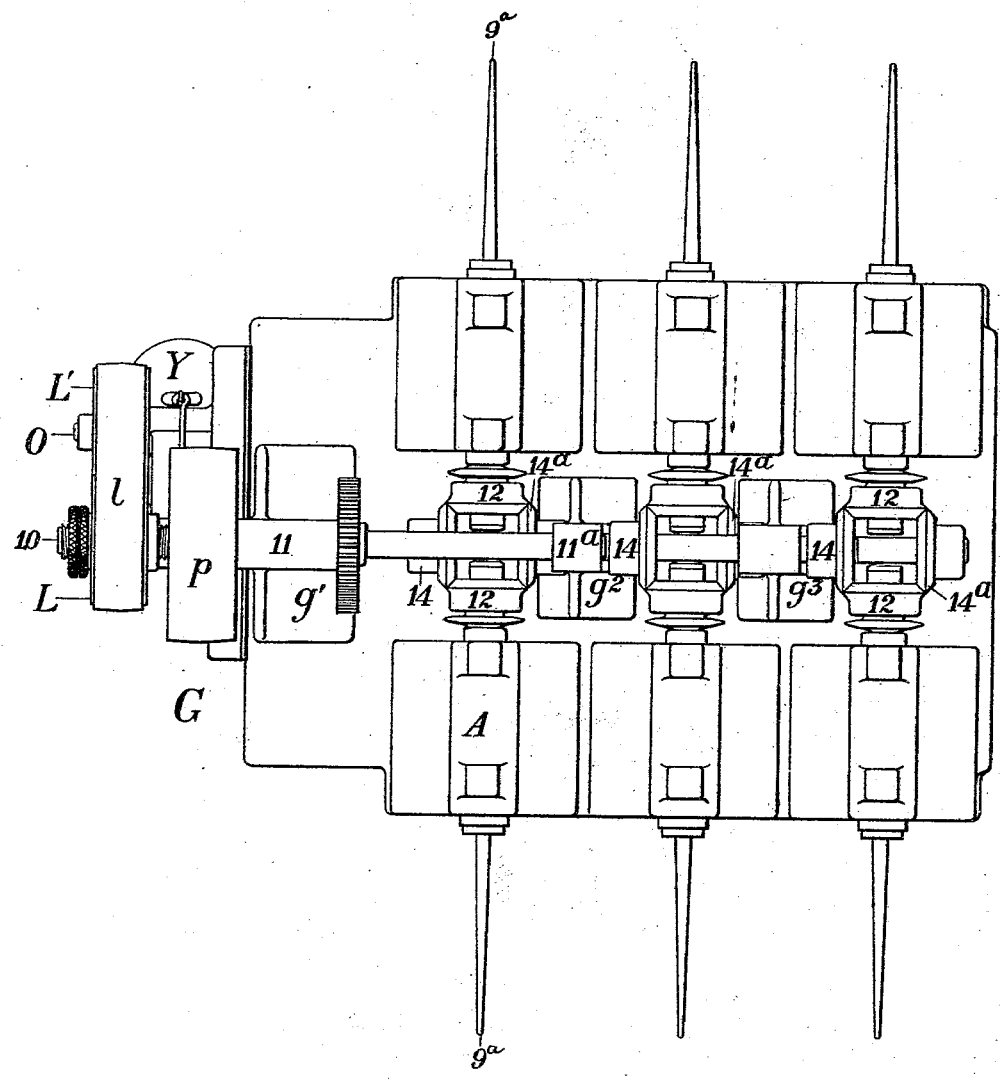
Figure 8:
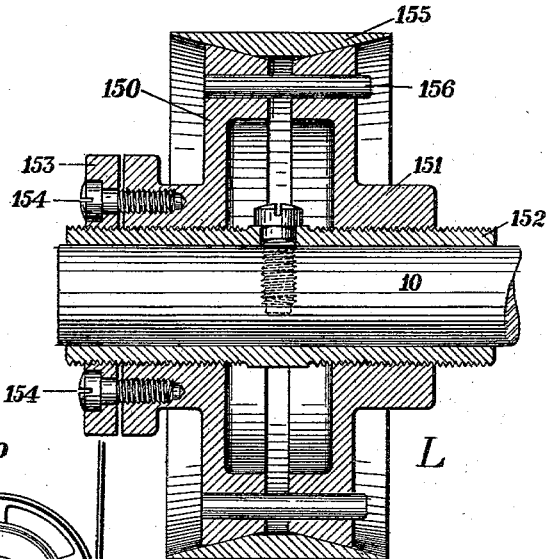
Figure 6:
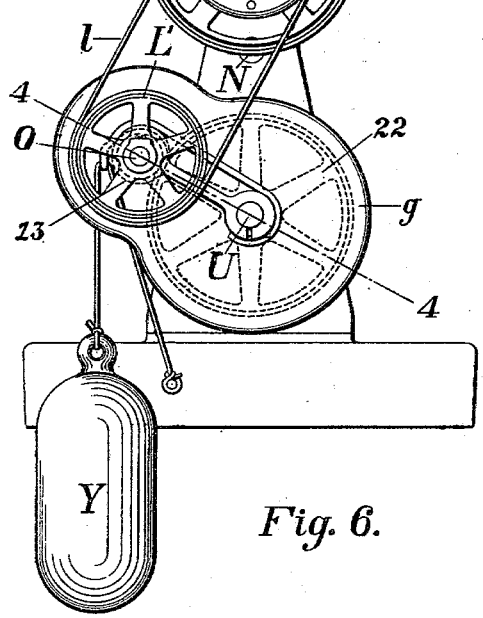
Figure 7:
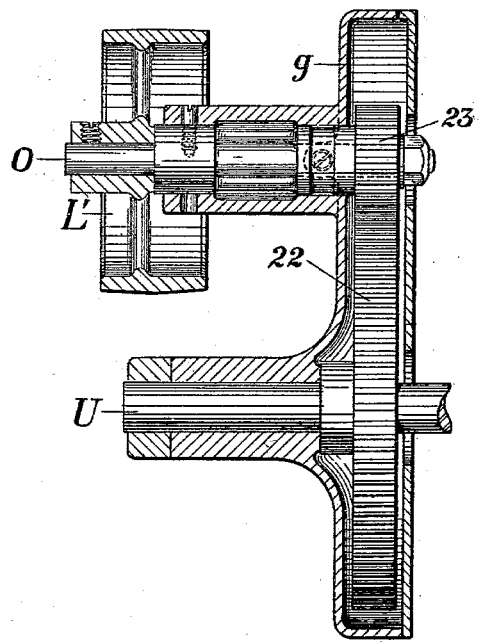
Figure 17:
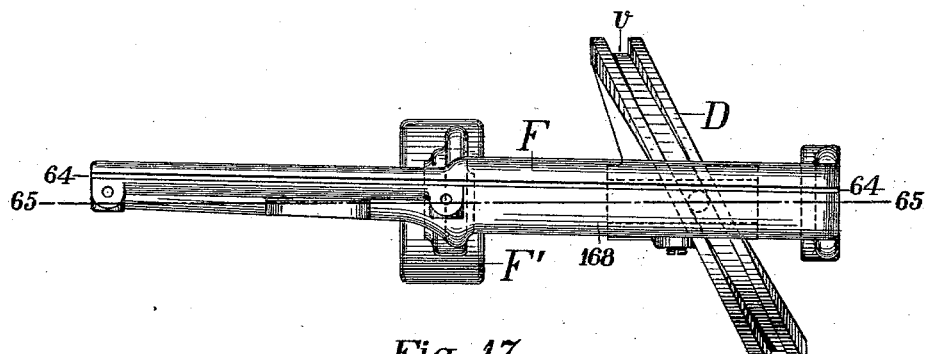
Figure 10:
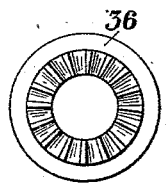
Figure 11:
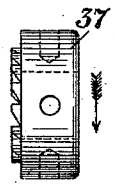
Figure 14:
Figures 15, 16:
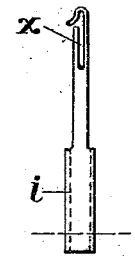
Figure 27:
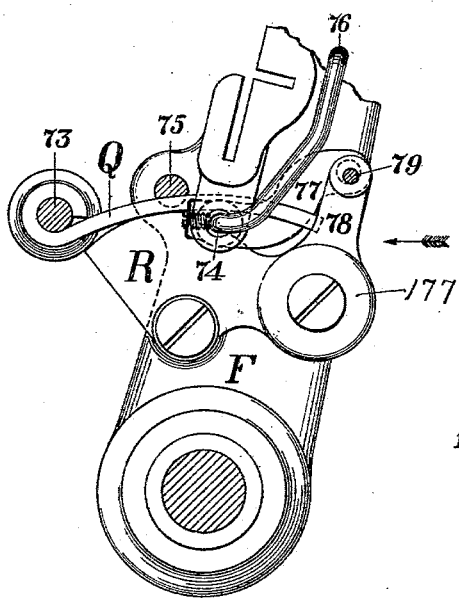
Figure 12:
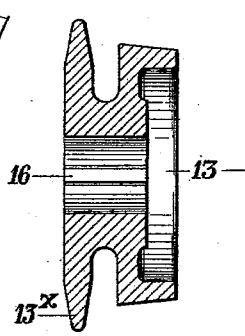
Figure 13:
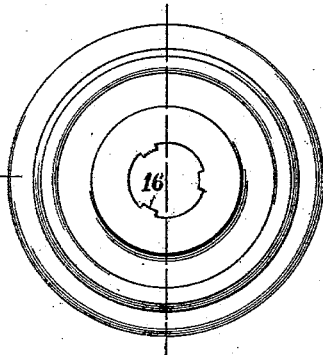
Figure 18:
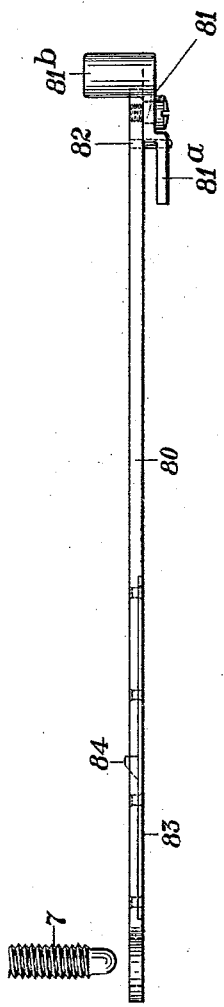
Figure 19:
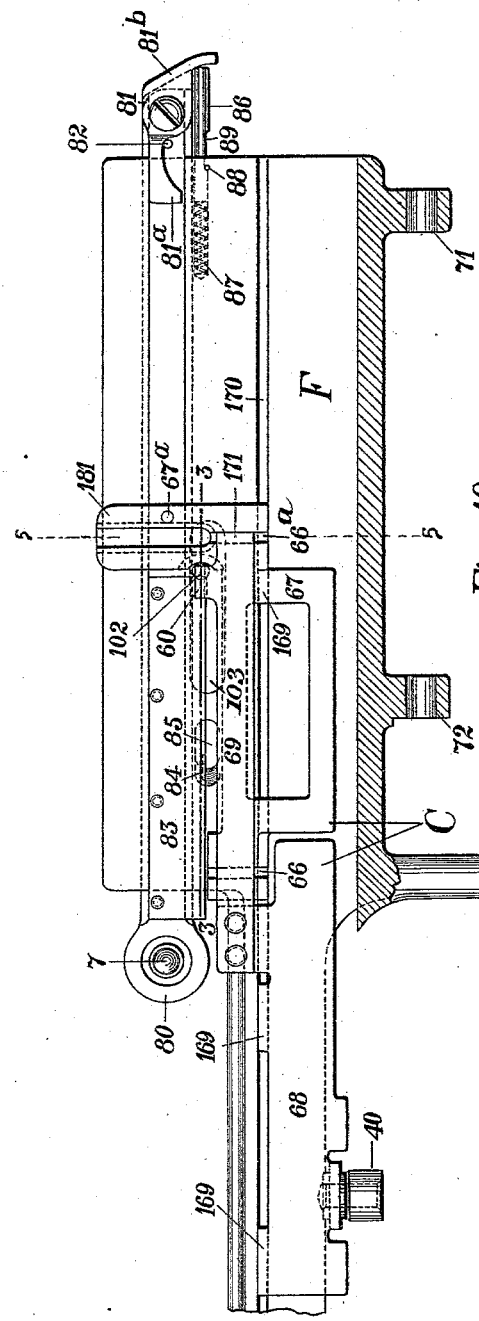
Figure 22:
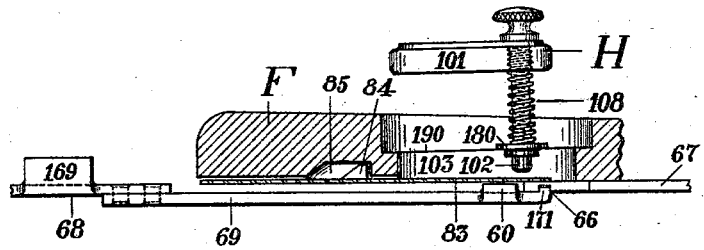
Figure 23:
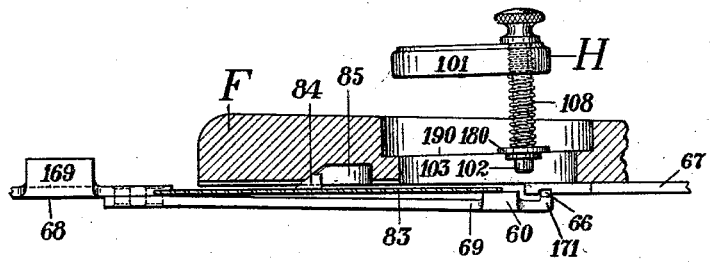
Figure 24:
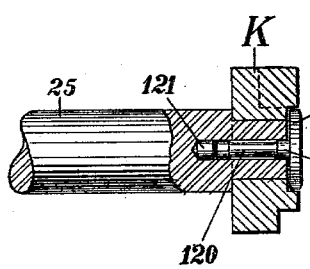
Figure 25:
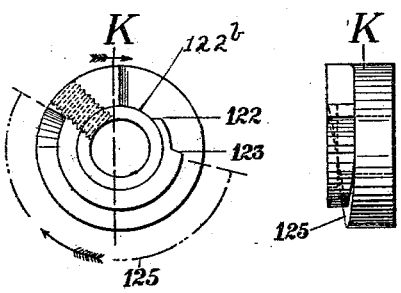
Figure 26:
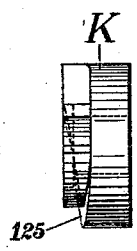
Figure 28:
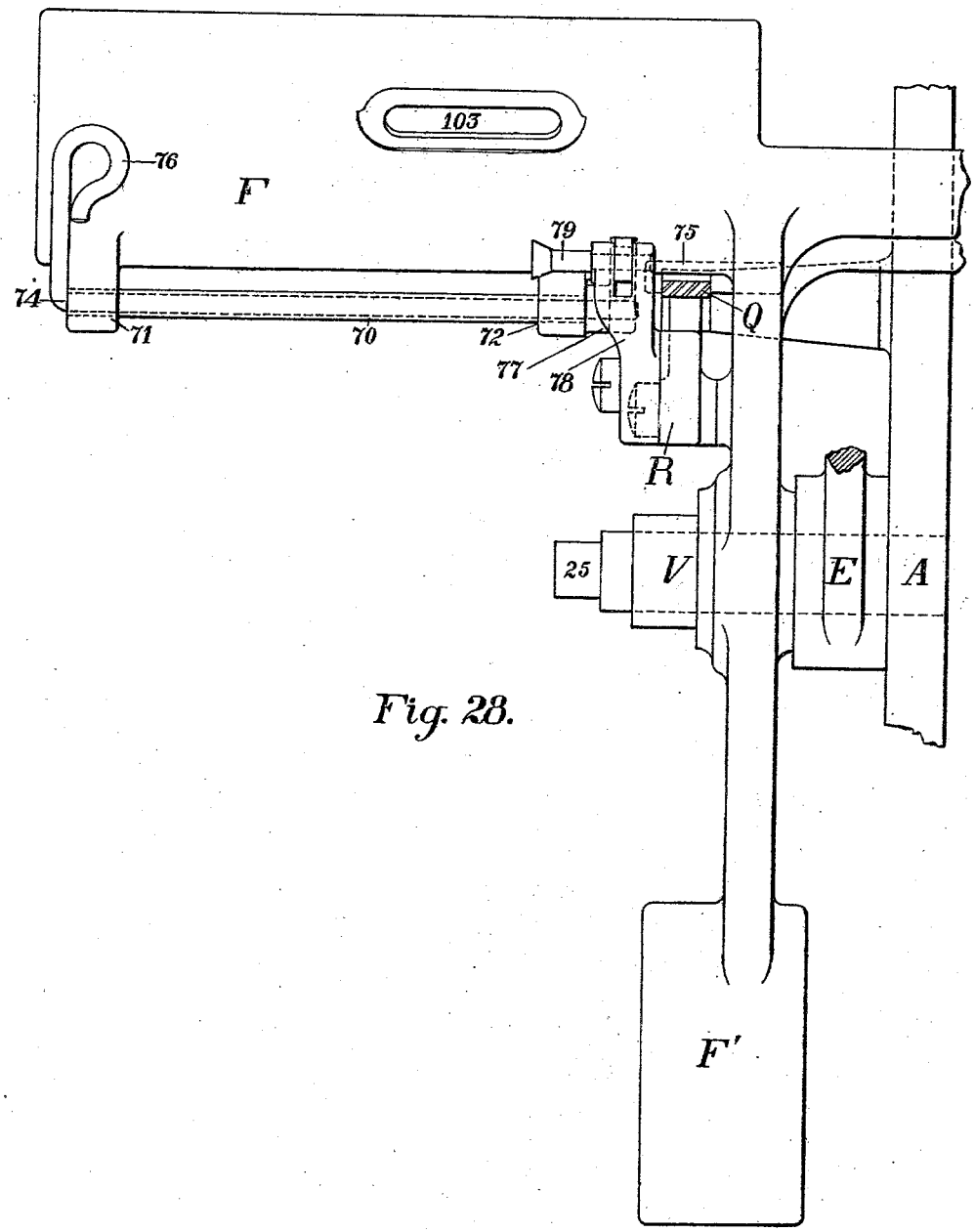

Figure 1 is an end view of one of the machines, showing the relation of the parts during the extension of the traverse. Fig. 2 is a longitudinal elevation of said machine, part sectional, on the line 1 1 looking in the direction of arrow $a$, Fig. 1. Fig. 3 is a front elevation of that end of the machine on which the winding is done looking in the direction of arrow $a$, Fig. 1. Fig. 4 is a front elevation showing a plurality of the improved machines arranged upon a single stand with a single gainer mechanism. Fig. 5 is a plan of Fig. 4. Fig. 6 is an end view looking from the left, Fig. 4, in the direction of arrow $d$. Fig. 7 is an enlarged section on the line 4 4, Fig. 6. Fig. 8 is an enlarged section of the expansion-pulley L. Fig. 9 is an end elevation looking from the right, Fig. 2, the clutch-wheels removed. Figs. 10 and 11 are face and edge views of a tightening device for the spring 32. Figs. 12 and 13 are sectional and face views of one of the clutch-disks 13. Fig. 14 is a section of the guide and holder. Figs. 15 and 16 are edge and face views of the guide. Fig. 17 is a plan of the swinging frame F and guide-actuating cam. Fig. 18 is a top view of the blade 80 of the stop mechanism. Fig. 19 is a longitudinal section of the upper part of the swinging frame on the line 2 2 looking in the direction of arrow $b$, Fig. 1, showing the guide-adjusting devices. Fig. 20 is a top view showing the position of the blade 80 at the completion of a cop. Fig. 21 is the same as Fig. 19 with the guide-carrier set farther outward. Figs. 22 and 23 are sectional views on the line 3 3, Figs. 19 and 21, enlarged, showing part of the devices for shifting the position of the guide. Fig. 24 is a sectional view illustrating the construction of the cam K and adjuncts. Fig. 25 is a face view of the cam K. Fig. 26 is an edge view of the cam K. Fig. 27 is an enlarged side view of the stop device and adjuncts for preventing the inward swing of the guide-carrying frame. Fig. 28 is a view of the parts shown in Fig. 27 and adjuncts looking from the right in the direction of the arrow. Fig. 29 is an end view of one of the machines, showing the relation of the parts during the winding of the cop-section. Fig. 30 is a view, partly in section on line 5 5 of Fig. 19, looking in the direction of the arrow.

The main parts of the machine, which are now well known and familiar to those versed in the art, are the main frame A, the winding-spindle $9^a$, the guide $i$, which is carried by a traverse bar and reciprocates opposite the spindle and is also carried by a pivoted guide-carrying frame F, weighted to cause the guide to bear on the cop as it is wound, but swinging back as the cop increases in size, and a detent or dog R, Figs. 27 and 28, which permits the outward swing of the frame F, but prevents it from swinging back during the winding operations. The traverse-bar is provided with a roll 40, which enters the groove of the traverse-cam D, Fig. 2, and the cam-shaft is driven from the spindle-shaft by means of suitable appliances, termed the "gainer mechanism," which permit the relation of the reciprocation of the guide and rotation of the spindle to be changed, and preferably the spindle so rotates and the guide so reciprocates that the thread is laid in successive reverse spirals, crossing each other and producing what is now known as a "V-wind" or "universal wind."

The tension device (shown in Figs. 1 and 3) consists of two members, between which the thread passes, one rigid and the other adapted to swing to be pressed against the thread, each with parallel separated fingers, those of one member alternating with those of the other, so that the thread passes in a zigzag course between them.

Before describing the machine in detail the principal operations to be mechanically performed thereby will be set forth in order that the functions of the various constituent members may be more readily comprehended and identified when the latter are explained in detail. To avoid confusion, the term "section" will be employed to designate the individual masses of thread which together constitute the completed package. The latter will be termed the "cop," and the device upon which it is wound shall be termed a "tube," and by the term "tube" shall be understood a quill, bobbin, spindle, or any other appropriate device which is or may be employed for such purpose.

In order to wind such a cop as has been indicated, the following cycle of events must occur, each at and only at its specified appropriate time, each performed mechanically with certainty and precision. At one end of an empty tube a section of predetermined proportions is wound, and when it has attained the desired diameter either the tube on which it is wound or the traversing guide which deposits each coil of thread in place must be so shifted that the path of traverse of the thread-guide lies entirely beyond the end of the section just finished, to wind a second section on the unoccupied portion of the tube adjacent the first section. If the package is to comprise more than two sections, this change in the position of the traverse relative to the last-completed section must occur at the completion of every section but the last, at the completion of which the winding-machine stops. Different means may be employed to produce the shifting referred to; but preferably an extensible traverse-bar is used, adapted to be mechanically elongated after the completion of each section but the last, as above set forth. The shifting mechanism is put into action mechanically by the swinging of the guide-carrying frame, which for convenience is termed the "traverse-frame." When the thread-guide bearing on the surface of the cop has swung a distance from the winding-spindle corresponding to the prescribed diameter of the completed cop, the guide-carrying frame or traverse-frame swinging with it is in a position for certain appropriate devices carried by said traverse-frame to be thrown into active connection with the operating mechanism of the winding-machine to shift the guide to a new operating position and cause the traverse-frame to swing to the spindle. Inasmuch as the thread-guide must necessarily be thrown back from the surface of the cop to piece broken ends or renew exhausted supplies, and as the winding must sometimes be stopped to perform these operations before a section is completed, there is danger that in swinging the guide away from the package to more readily piece the ends the guide-shifting devices shall be operatively connected with the machine to shift the traverse as soon as the winding is started, thus causing a new section to be started before the preceding one is completed. To avoid this, the guide-shifting devices are so related to the operating mechanism that they shall be thrown into active connection therewith only when the latter is in operation. This provision is adequate for the purpose intended, because the thread-guide will never be withdrawn from the surface of the cop during the winding, except by accident, which of itself would spoil the cop. An essential feature of the various machines employed to produce the V-wind is a detent which allows the thread-guide during the winding of the cop to move only away from the spindle unless released by the operator. In the improved machine when one section of the cop has been finished and the next of the series is to be started the detent or "dog," as it is termed, is released automatically to allow the guide to return to the spindle and then be left free to perform its function as the new section is wound. When the package is completed, the winding is stopped by suitable instrumentalities constituting a "sizing device," whose action is influenced by the diameter of the final section in the same manner as the action of the traverse-shifting mechanism is influenced by the diameter of the first section or sections, this sizing device being so arranged that the winding shall stop only when the appropriate section (the last one of the series) has attained the desired diameter.

The traverse-bar C slides in the traverse-frame F and is sectional or otherwise adapted to be extended mechanically to shift the position of the traverse of the guide in relation to the tube as one after another of sections that form the complete package for use in loom-shuttles is finished.

The cops wound in this machine are slightly conical to better provide for the delivery of the thread. To obtain the desired form of cop, the winding-spindle $9^a$ is made of appropriate taper and the groove 64 64, Fig. 17, in the bar 168 of the traverse-frame F, in which the traverse-bar C runs, is so inclined to the axis 65 65, on which said traverse-frame swings, that the reciprocating guide $i$ follows the surface of the winding-spindle $9^a$ to form a cop of corresponding taper. The two sections 67 and 68, Fig. 19, of the traverse bar C slide end to end in the groove mentioned, each provided with guides 169, extending into a groove 170 at right angles to the main groove to prevent vertical movement. For convenience the section 68 is designated as the "guide-driver" and section 67 the "guide-carrier." The two are joined by a spring-catch 69, one end of which is riveted to the guide-driver 68, while the other has a lug 171 at right angles, adapted to a slot 66 in the guide-carrier 67. At suitable intervals along the guide-carrier other similar slots can be cut, dependent on the number of sections to be included in the cop and consequent number of changes of traverse of the guide. Fig. 19 shows the guide-carrier 67 and the guide-driver 68 closely adjacent, as when the guide is supported in proper position to wind the first section, and Fig. 21 the same parts extended, when the guide is supported in position to wind the last section of the cop. The operation of these parts is as follows: When the parts are set as in Fig. 19, the first cop is wound, and when it has attained its full diameter and the guide is at the point of its traverse farthest removed from the frame A the spring-catch 69 is pushed out by devices operating automatically and caused to release the guide-carrier 67, which by adequate means is moved longitudinally sufficiently to carry the thread-guide clear of the end of the completed cop. This adjustment of the guide-carrier is also sufficient to just bring the next slot 66ª in the guide-carrier into such a position that when the cam has completed a half-rotation and drawn the guide-driver back to its opposite extreme of travel the lug 171 at the extremity of the spring-catch 69 will snap into said slot, thus again connecting the guide-driver to the guide-carrier, so that the guide is in position to wind the next section of the series opposite another part of the tube. While this extension of the traverse-bar takes place the winding-spindle continues its rotation, so that the thread passes from the periphery of the finished cop-section across the end of the latter and makes several coils about the spindle before the next succeeding cop-section is started. This apparently incidental action of the machine is important in winding a sectional cop of the character and in the manner for which this machine is designed. Devices may be made whereby the extension of the traverse-bar could be effected without this intermediate winding occurring as it does. Should this be done, a loop would be formed in which the thread-guide would catch on its inward traverse, breaking the thread and destroying the cop. The intermediate winding described causes the thread to be carried upon the completion of one cop-section close beside the end of said completed cop-section to the tube and then by making several turns or coils around the tube so binds the thread in place that no interfering loop can be formed.

In order to mechanically disconnect the guide-driver 68 from the guide-carrier 67 and change the position of the latter, as just described, a lever H, Figs. 2 and 29, is adapted to rock and slide on a sleeve 70, held in bearings 71 and 72 on the frame F, and is provided at the extremity of its arm 101 with an adjustable projection 102. This projection is adapted to be so protruded by the agency of suitable devices through a slot 103 in the frame F as to press the extremity of the spring-catch 69 from the slot into which it fits. Adjacent to the rocking lever H on the sleeve 70 is a coiled pressure-spring 104, which tends to force the lever H in the direction of the arrow, Fig. 2, toward the frame A. The lower arm 105 of the lever H carries a block 106, adapted to engage with a cam K on the cam-shaft 25 and in such position that its cycle of action is properly correlated to that of the traverse-cam D. The cam K should operate only when disconnecting and shifting the guide-carrier 67, to which end during the period of winding the cops the block 106 rides inactive on the middle portion of the cam K. To minimize the friction and prevent wear on the block and cam, the center of the cam K is provided with a member K', Fig. 24, having a disk 119, which fits a depression in the middle part of the cam protruding slightly above the face of the latter and supported by the small spindle 120. The spindle 120 has a bearing in an axial hole in the cam-shaft, which is fitted with a step 121 for its end. During the period of winding between the times of shifting the traverse of the thread-guide the member K' remains stationary by contact with the block 106, supporting the latter above the face of the cam, the outer edge of disk 119 being beveled to provide for raising the block 106 when the latter is forced onto it by the action of spring 108. The cam-shaft 25 and cam K rotate about the member K', and to further minimize the friction between the spindle 120 and the cam-shaft 25 the middle portion of the spindle is reduced in diameter, leaving bearing-surfaces at the ends only. The disk 119 is free from contact with the cam K.

From the lever H, Figs. 1 and 29, an arm 107 extends laterally and directly beneath a projection 131 of the lever S, making contact therewith at all times during the winding of a cop-section and so posed relative thereto that the movement of the traverse-frame F away from the spindle during the winding shall cause the lever H to be rocked to move the block 106 outward from the axis of the cam K and into operative engagement therewith. To insure that the lever H shall not be rocked by moving the traverse-frame F away from the winding-spindle while the winding is stopped, thus causing an untimely operation of the traverse-extending devices and the results detailed heretofore, the lever S is so connected with the starting and stopping devices of the machine by means of the arm 133, attached to the shaft 31 and the connecting-rod 132, that when the winding is arrested by the action of the stopping devices the projection 131 is withdrawn from contact with the arm or cam 107 by the rocking of the shaft 31 in the direction of the arrow, Fig. 1. The arm 133 is adjustable on the shaft 31, so that the position of the projection 131 relative to the arm 107 may be varied to effect the engagement of the block 106 with the cam K when the traverse-frame reaches the distance from the winding-spindle corresponding to the desired diameter of the cop-section being wound.

Fig. 1 indicates the position and relation of the parts at the time of extending the traverse-bar just following the completion of a cop-section. The block 106 has just been operated upon by the second radial rise 123 of the cam K, so that the projection 102 has just been protruded through the traverse-frame F to disengage the guide-driver from the guide-carrier and to engage with the latter to commence the extension of the traverse-bar. Fig. 29 indicates the position and relation of the parts at the commencement of winding a cop-section. When the winding of a cop is to be started, the handle or starting-lever E' is rocked to the right into position indicated by the full lines, Figs. 1 and 29, and locked in engagement with the stopping-lever E. The rocking of the handle E', as described, causes, through connections above specified, the lever S to be rocked to throw the projection 131 into contact with the lever-arm 107, which is so inclined to the direction of its own motion—with the traverse-frame F, as the latter swings back from the winding-spindle with the increasing diameter of the cop-section—that, bearing against the projection 131, it is depressed. The depression of the arm 107 causes the block 106 to swing outward from the center of the cam K until the prescribed diameter of the cop-section is attained, when the block aforesaid passes from the center portion of the cam K beyond the edge 122$^b$ (see Fig. 25) and is forced by the spring 104 into the space in front of the rise 122. The latter sufficiently moves the block 106 to rock the projection 102 into close proximity to the traverse-bar and the spring connection 69. After this movement and after the spring 104 has so far moved the lever H that the block 106 rests against the surface 125 of the cam K the rise 123 engages the block 106 to again rock the lever H to protrude the projection 102 through the traverse-frame F. The projection 102, striking the lug 60 of the spring-catch 69, disengages the guide-carrier from the guide-driver, forcing the lug 171 of said spring-catch from the slot 66 in the guide-carrier 67. This disengagement occurs as the traverse-bar C is completing a traverse outward from the machine. The projection 102 in disengaging the spring-catch 69 passes close by the side of the vertical member 181 of the guide-carrier 67. (See Fig. 19.) The block 106 having been moved to its full extent outward from the axis of the cam K by the rise 123 engages the helical rise 125, which causes the lever H to move longitudinally in its bearings outward from the machine. The projection 102, engaging the edge of the vertical member 181, moves the disengaged guide-carrier 67 also outward from the machine the necessary distance for the thread-guide $i$ to clear the completed cop-section. In the meantime the cam D is moving the guide-driver 68 to the opposite or inward extreme of its traverse, and the actions of the cam D and the cam K are so correlated that when the guide-driver reaches its inward extreme of traverse the second slot 66$^a$ at the inner end of the guide-carrier 67 registers with the catch 171, which snaps into said slot, thereby reuniting the guide-driver with the guide-carrier in their extended relation. With the reciprocation of the guide-driver the guide-carrier will now be reciprocated opposite a new and independent portion of the winding-spindle to wind a cop-section adjacent to the one just completed. Immediately upon the reconnection of the guide-carrier to the guide-driver the latter commences its return or outward traverse, moving the guide-carrier faster than the projection 102, and therefore away from it. The projection 102 does not complete its movement due to the action of the helical surface 125 of the cam K immediately upon the reconnection of the guide-carrier and guide-holder, but continues its outward movement to effect the shifting of the traverse-frame dog R, as will be later explained, and which must be so timed that it cannot occur before the thread-guide is clear of the completed cop-section.

It is well to note at this point the essential functions and relation of the two separated rises 122 and 123 on the cam K. When the traverse-bar C is to be extended, the projection 102 must obviously be moved by the spring 104 a sufficient distance toward the machine to insure that it shall pass by the vertical member 181 of the guide-carrier 67 when protruded through the traverse-frame F. Were the cam K so constructed that the block 106 could be engaged and operated by the final rise 123 immediately after leaving the edge 122$^b$ the projection 102 might be protruded through the traverse-frame F too soon and forced against the guide-holder 181 rather than past it, causing damage to the machine. For this reason a first or preliminary rise is provided at 122 and at such a distance from 123 as shall insure the complete movement of the lever H under the action of the spring 104 before the projection 102 can be protruded through the traverse-frame F by the action of the rise 123. Should the block 106 complete its outward movement from the axis of the cam K' just too late to be engaged by the rise 122, it cannot engage with the rise 123, but must remain in its position until the cam K has sufficiently rotated to permit its proper engagement with the rise 122.

The traverse-frame swings freely outward from the winding-spindle, but is restrained from inward movement by the pinching of an arc Q, pivoted at one end on the stud 73, attached to the main frame between a flattened pin 75 and the dog R, Figs. 27 and 28. The traverse-frame dog is maintained in close contact with the arc Q by the weight of the arm 177 and its connections. When the traverse-frame is pressed toward the winding-spindle, the friction between the arc Q and the traverse-frame dog causes the latter to turn slightly, pinching the arc Q and preventing a movement of the traverse-frame, as described. When the guide has been shifted and is in a position for winding the next section, the dog R must be automatically released that the traverse-frame may be free to carry the guide back to its former position close to the winding-spindle under the influence of weights 61, Figs. 1 and 3, which are attached to a cord connected to the lower arm F' of the traverse-frame F and carried over a pulley 175, Fig. 3, turning on a stud on the frame A. The employment of this dog, as well as other forms of detent, has been attended with some inconvenience, owing to the fact that with constructions heretofore employed the operator must use two hands to insure that when the guide has been moved away from the cop it shall be properly returned thereto before again starting the winding. Operators would frequently release the dog and allow the traverse-frame to swing back toward the winding-spindle under the influence of the pressure-weights 61. Where these weights were but slight, little difficulty might be experienced; but usually the guide on striking the surface of the package would rebound and remain at a distance from the cop, and the operator without noticing this would start the winding and spoil the package. A natural and almost invariable tendency on the part of inexperienced operators is to replace the traverse-guide against the package by pushing the traverse-frame toward it, and failing in this they either go no further and omit the operation or perform it in the manner above outlined, so that it is not effective. To prevent such effects, the dog is moved from a handle 76 at the outer end of a rod 74, carried by the frame F, and which at the opposite end carries an arm 77, connected with the dog R by means of the link 78 and a pin 79. The position of the handle 76 of the rod 74 is such that the operator places the guide against the package in the manner that is intuitive—that is, by placing the hand on the handle to push in the frame F—and as the hand remains on the frame there is no rebound and incidental damage to the cop. The pin 79, connecting the arm 77 and the link 78, is provided with a conical head at its outer extremity, Figs. 2 and 28, to engage with a set-screw 110, carried in a projection of the lever H. After the two sections of the traverse-bar have been connected and the guide i starts outward from the frame A, driven by the cam D, the block 106, still bearing on the rise 125 of the cam K, Fig. 25, continues the movement of the lever H outward from the frame A, thereby bringing the extremity of the screw 110 into engagement with the conical portion of the pin 79, the extremity of said screw having been thrown into line with the conical portion by the first rocking motion of lever H. This conical head of the pin 79 acting as a wedge serves, through the link 78, to lift the weighted arm of the dog R, thereby then releasing the frame F and permitting the frame, with its guide i, to be swung toward the winding-spindle under the influence of the weights 61. At the completion of the above cycle of events the block 106 is at the outmost point of the rise 125, and under the influence of the spring 108, Figs. 22 and 23, acting between the arm 101 of the lever H and a washer 180, bearing on shoulder 190 adjacent to the slot 103 of the frame F, is forced back on the middle portion of cam K, thereby removing the projection 102 from the path of the traverse-bar C and releasing the screw 110 from contact with the pin 79, allowing the dog R to again perform its functions during the winding of the new cop. When the block 106 has been forced back to its normal position at the middle of the cam K, the projection 107$^a$ of the lever H, striking against the lower part of the traverse-frame F, prevents excessive movement of the lever H under action of the spring 108.

The lever E carries a long screw 7, upon which the frame F when swung away from the winding-spindle acts to disengage the detents 43 and 46 to stop the winding, as shown in Fig. 1. This screw can be protruded a greater or less distance through the lever E, thus regulating the distance to which the frame F can be swung, and consequently the diameter of the cop at the time the unwinding thereof is arrested. To coact with this screw there is a sliding blade 80, sliding in a dovetailed groove in the frame F, Figs. 18 to 21. At the inner end of the blade opposed to the screw 7 is an opening of sufficient size to pass over the end of the screw without contact, and during the winding of all but the last cop in the package this opening is directly opposite the end of the screw, as in Figs. 18 and 19, so that the frame F can be swung back without the blade then touching the screw. By this means the machine instead of ceasing work entirely when the first section attains its proper diameter simply ceases work on that section, and by aid of the devices already described automatically transfers the winding operation to the unoccupied portion of the tube beyond the first section. When, however, the guide is shifted to wind the last section of the package, the blade 80 is moved to bring the solid portion directly opposite the end of screw 7, as in Figs. 20 and 21. Now when the final section attains its full diameter this solid portion aforesaid will come into contact with said screw and, pressing against it, cause the winding to be stopped, as above described. To secure this action of the blade 80, the latter carries at the outer end a pivoted member 81, provided with two projections 81$^a$ and 81$^b$. The projection 81$^a$ is so arranged that the guide-holder 181 of the guide-carrier 67 shall pass between it and the traverse-frame F, and the inner end of the projection 81$^a$ is in position to contact with a pin 67$^a$ on the guide-holder 181, Figs. 18 to 21, to move the slide 80 into such relation to the screw 7 as to stop the winding when the frame F has swung out sufficiently, as above set forth. This operation of setting the blade 80 is performed when the guide-carrier makes its first stroke outward in the winding of the last section, and when the cop attains the proper size the blade 80 will make contact with the screw 7 and cause the machine to be stopped. When the composite cop is completed and removed, the guide-carrier must be returned to its initial position. To effect this, the member 81 is provided with a projection 81$^b$, which forms a thumb-piece at the outer end of the slide 80 and extends downward to engage a pin 86, which fits a socket in the traverse-frame F. This pin is carried outward by a spring 87, and its movement is limited by a pin 88 in the frame F extending into a slot 89 of the pin 86, as shown in Fig. 19. Riveted loosely to the slide 80 is a plate 83, provided with a wedge-shaped lug 84, Fig. 18, formed by bending a part of said plate at right angles and into a recess 85 in the traverse frame, which recess has its inmost end inclined, rising to the face of said frame, as shown in Figs. 22 and 23. To disconnect the guide-carrier from the guide-driver, the thumb-piece 81$^b$ is pressed down, and first the projection 81$^a$ is raised to a position to avoid contact with the pin 67$^a$ if the guide-carrier 67 happens to remain at or near the end of its traverse when the machine has ceased winding. Continued pressure brings the thumb-piece 81$^b$ against the end of the blade 80 and forces said blade toward the frame A, and the lug 84 of the plate 83, riding on the inclined end of the recess 85, forces the lower edge of said plate outward, Fig. 23, against the projection 60 of the spring-catch 69, thereby releasing its lug 171 from the slot 66 in whatever position of traverse it may be. This allows the guide-carrier 67 to be moved back to receive the extremity 171 of spring-catch 69 in the appropriate slot for winding the first cop. The upward movement of the projection 81$^b$ is limited by a pin 82 on blade 80, and the pin 86, actuated by the spring 87, Fig. 19, and bearing against the lower part of said projection, forces said projection upward and bearing thereon moves the blade 80 back from the position to which it has been pressed until the opening in said blade is opposite the screw 7. The machine is then ready to wind a new cop.

Where the machine is small and particularly adapted for a class of work in which one operator must attend a number of spindles, it is preferable to mount several of these machines on one bed to be driven from and controlled by a single common gainer mechanism G. This single gainer mechanism is constructed and arranged to operate in connection with a plurality of machines as follows: As shown in Figs. 4 and 5, at the top of the standards $g'$ and $g^2$ is a shaft 10, supported in the bearings 11 and 11$^a$. Attached to this shaft and adjacent one end of the bearing 11 is the driving-pulley $p$, and at the opposite end of the bearing is the gear $m$, meshing with a gear $n$, carried on and rotating the shaft N, said shaft having a bearing 8 in the standard $g'$. At one end of the shaft 10 and adjacent the driving-pulley $p$ is the expansible pulley L, described in my applications Serial Nos. 20,239 and 20,454. (Shown in detail in Fig. 8.) The hub of the pulley consists of two disks 150 151, threaded and adjustable to and from each other on a threaded sleeve 152, secured to the shaft 10 and fixed in place after adjustment by a binding-nut 153 and clamp-screws 154. The periphery of the pulley is a ring 155, split transversely and with inner beveled faces adapted to correspondingly-beveled peripheries of the disks 150 151, so that by bringing the latter together or separating them the ring is expanded or contracted to vary the diameter of the pulley. The parts of the sleeve on which the two disks are mounted are reversely threaded, so that by turning the two disks (connected by cross-pieces 156) in the same direction they are separated or brought together. The cam-driving shaft U protrudes beyond its bearing 20 and carries in a swinging frame $g$, adjacent thereto, the gear 22, which in turn meshes with a pinion 23, Figs. 4, 6, and 7, attached to a shaft O, which rotates in a suitable bearing in the swinging frame $g$. The shaft O carries at the opposite end a pulley L', driven from the expansible pulley L by a belt $l$. The latter is maintained tight to prevent slipping by means of the weight Y, hung from the free end of the swinging frame $g$. By increasing or decreasing the diameter of the expansible pulley L the speed ratio of the shafts N and U and their connected devices may be varied as desired. The two shafts N and U are supported in bearings in the standards $g^2$ and $g^3$, there being a sufficient number of the latter dependent on the length of the bed and of the shafts to be supported and are connected to drive the shafts 9 and the cam-shafts 25, respectively, by means of bevel-gears 14 and 14$^a$, each gear serving to operate the corresponding mechanism of two machines arranged in line with each other, as shown in Figs. 4 and 5, the gear 14 driving two opposite winding-spindles through the clutch-gears 12 and the gear 14$^a$ driving two opposite cam-shafts through the clutch-gears 12$^a$. The rear end of each shaft 9 is reduced in diameter to form a shoulder, against which bears the washer 18, Fig. 2. Adjacent to this washer is the bevel-gear 12, turning freely on the shaft 9 and held in place by the head of screw 19 in end of said spindle. The bevel-gear 12 has an internal annular beveled clutch-seat adapted to receive and engage with the periphery of a friction-clutch 13 to drive the shaft 9. The clutch and winding-spindle are connected to rotate together by means of usual keys or splines, allowing the clutch to slide freely to be thrown into engagement with the clutch-gear 12 to drive the shaft and winding-spindle or to be withdrawn when the motion of the latter is to be arrested. Any desired number or arrangement of splines may be employed; but I prefer to use a plurality of them, as indicated in Figs. 12 and 13. The splines 16 in this case are made integral with the clutch and are fitted to appropriate grooves or keyways in the winding-shaft 9. Adjacent the end of the spindle-bearing J, Fig. 2, and fast on the spindle is a collar $r$, which, together with the collar 53 on the front end, holds the spindle in place. Bearing against collar $r$ is the saucer-shaped spring 15, which forces the clutch-disk 13 into engagement with the clutch-gear 12. The gearing and clutch connections on the cam-shaft 25 are identical in operation and, with one exception, in structure with those just described. The cam-shaft 25 is held in place solely by the cam D, clamped thereto and whose hub extends between the two bearings V and W, thus preventing end play. To provide for the thrust of the spring $15^a$ of the cam-shaft, a thin washer $s$ is interposed between said spring and a second shoulder on cam-shaft 25.

When for any reason the winding must be arrested, it is essential that both the winding-spindle and the cam shall stop at the same time. To this end there are two levers T and T', Figs. 2 and 9, which are adapted to withdraw the clutches from engagement with their corresponding gears. The devices for disengaging the clutches from the gears are as follows: On each clutch is a disk portion oppositely beveled at its outer edge to make the latter of substantially triangular section. Adjacent the triangular edge is the extremity $t$ or $t'$ of the lever T or T', in which there is an angular opening with sides made to match those of the rim of edge 13. This angular opening in the lever T or T' is not directly opposed to said rim, but is so related thereto that when the lever T or T' is rocked to engage the clutch the extremity $t$ or $t'$ forces the clutch from connection with its gear by the wedging action of the engaging surfaces. The levers T and T' serve also as brakes to overcome the momentum of the rotating parts and insure their stopping promptly. These levers are operated from the rocker-shaft 31 at the top of the machine through the arm 33 and the roll 34, carried at its extremity. This roll is supported to move between the forked extremities 161 162 of the two levers T T', Fig. 9, to swing them either into or out of engagement with their corresponding clutches. The roll 34 fits loosely on its pin on the arm 33, so that when forced in one direction it acts with substantially equal pressure on both levers to withdraw the clutches from their gears. When forced in the opposite direction, the levers are rocked positively away from the clutches, leaving the latter to operate under the influence of the springs 15 and $15^a$ to engage the clutch-gears. The lever T is provided with an arm 35, which when the said lever is forced from the clutch limits its movement by contact with the lever T' and prevents it from so falling as to be placed beyond the line of action of the roll 34. The shaft 31 rocks in bearings at the top of frame A, and the spring 32, Fig. 2, acts to turn it in the direction of the arrow $j$, Figs. 1 and 9, to cause the stopping devices above described to arrest the winding. Provision for adjusting the tension of the spring 32 is made in the adjacent collars 36 and 37, whose opposing faces have clutch-teeth so formed, Figs. 10 and 11, that the collar 37 is free to rotate on the shaft 31 in but one direction. The collar 36 is fastened to the shaft 31 and in such relation to the spring 32 that the latter forces the collar 37 against it and the clutch-teeth into engagement. The spring 32 is connected with the collar 37 at one end and held from turning by a lug $u$ on frame A at the other end. Radial holes are provided in the collar 37 to admit the insertion of a suitable implement to turn said collar to increase the torsional force of the spring.

Near the opposite end of the shaft 31 from the arm 33 and adjacent the frame of the machine is the lever E', with which the operator starts the winding. When in the forward position, (indicated by the full lines in Fig. 1,) the detent 46 at the extremity of the lateral projection 45 is engaged with a corresponding detent 43 on the lever E. At such a time the levers T and T' are withdrawn from engagement with the respective clutches and the driving and winding mechanisms are operatively connected. To stop the winding, the operator presses the lever E to the right, Fig. 1, disengaging the detents 43 and 46 and permitting the spring 32 to turn the rocker-shaft 31 and act upon the stopping mechanism to arrest the winding. The lever E is supported on the cam-shaft bushing V, Fig. 2, adjacent the hub $f$ of the traverse-frame F, which carries the traversing thread-guide, and both are restrained from end play by the collar 26, clamped to the outer end of the bushing V. The lever E is pressed toward the winding-spindle by a spring 41, dotted lines, Fig. 1, held in sockets, one in the tension-bracket A' and the other in the under edge of the lever E. To properly gage the amount by which the two detents 43 and 46 shall interlock, a set-screw 47, carried by the bracket A', bears on a lug 166 of the lever E.

The shaft 9 carries a collar 53, Figs. 1, 2, and 29, and on the lever E is pivoted a lever 51, having a weighted upper arm, with a projection $51^a$, and at the lower end of the opposite arm a pin 56, on which bears the thread during winding, so that its tension sustains the upper arm of the lever 51 and withholds the projection $51^a$ from contact with the collar 53. The face of the projection $51^a$ is not concentric with the pin or stud $51^b$, on which the lever 51 swings, but has a slight pitch, forming a rotatable wedge, so that when said face makes contact with the collar 53 the friction between the two members causes the upper arm of the lever 51 to be drawn downward, thereby wedging or forcing the lever E back from engagement with the lever E' and causing the winding to be stopped. As oil and lint tend to gather on the collar 53 and neutralize the friction between it and the projection $51^a$, one or more flats $53^a$ are formed on said collar, causing the latter to positively engage the lever 51.

The tension devices are carried in the bracket A', attached to the frame A of the machine, and are caused to act by appropriate means. Those indicated, Fig. 1, comprise a hook $y$ on the lower arm F' of the traverse-frame F, through which a cord is passed, connecting the movable tension member $c$ with a rod $z$, on which any desired number of weights $w$ may be placed. To mechanically open the tensions, the movable tension member $c$ has an arm $q$, either attached or made integral therewith, as shown in Figs. 1 and 3, which when the tension is mounted on its bracket A' extends toward the main frame A. The lever 51 is extended beyond the pin 56 to engage with the arm $q$ when rocked in the direction of the arrow $e$, Fig. 1. To rock the lever 51 in this desired direction, a pin $o$, Fig. 3, in the projection 45 of the lever E' engages with a lug $51^a$ on the upper arm of the lever 51. When lever E' is in the forward position, (indicated by full lines in Fig. 1,) the upper arm of the lever 51 is free to engage the collar 53 to disengage detents 43 and 46; but when said detents are disengaged the movement of the lever E' (actuated by spring 32 on rod 31, Fig. 2) brings the pin $o$ against the lug $51^a$, and thus carries the upper arm of lever 51 upward, thereby rocking the lower extremity against the arm $q$ to open the tensions. When the lever E' is turned to start the winding, the lower extremity of the lever 51 is carried by the weight of the upper extremity away from the rod $q$, leaving the tension $c$ free to respond to the action of weights $w$.

The traverse-guide employed in this machine must be made very narrow in order to wind the adjoining cop-sections close together and also to wind close to the base of bobbins that are frequently used with loom-shuttles. Further, it must be so formed that when bearing on the barrel of the bobbin neither the base of the latter nor the cop-section next adjoining it shall interfere with the body of the guide or with adjoining parts. Again, as speed is a prime essential in machines of this type the guide must be as light as possible. To this end I make the upper portion of the guide thin and narrow, curved outward in substantially the form of a bow and far enough to permit the convex side of the guide to rest on the barrel of the bobbin without the interference mentioned. At the point where the guide bears on the bobbin or on the cop is an eye $x$ with a lateral opening through which the thread is introduced. The bottom or body portion of the guide is substantially "dovetail" in cross-section to fit the corresponding socket in the traverse-bar.

I do not here claim the construction of tension device shown, as it forms the subject of a separate application, Serial No. 70,253, filed July 30, 1901.

Without limiting myself to the precise construction and arrangement of parts shown and described, I claim as my invention—

1. In a cop-winding machine, the combination with a rotary spindle, of a guide, and means for reciprocating the guide opposite one portion of said spindle to complete a cop-section, and then opposite another portion of the spindle to wind another cop-section.

2. The combination in a cop-winding machine, of a rotary spindle, a guide, means for shifting the guide to different independent positions along the spindle, and means for reciprocating it in each of such positions to build a cop-section.

3. In a cop-winding machine, the combination of a rotary spindle, guide, means for reciprocating the guide opposite one part of the spindle to build up a cop-section, and means for then mechanically shifting the guide to different positions along the spindle during the winding of a cop, and for reciprocating it to build up another cop-section after one is completed.

4. The combination with a rotary spindle, of the guide-driver and means for reciprocating the same, the guide-carrier, guide carried thereby, and means for connecting and retaining the carrier with the driver in one position during the winding of a cop-section, and for then connecting and retaining them in a different position during the winding of another cop-section.

5. The combination of a rotary spindle, the guide-driver and means for reciprocating the same, the guide-carrier and guide carried thereby, and means for mechanically shifting the position of the guide-carrier relative to the guide-driver by an amount exceeding the length of traverse of the guide, and means for securing it fixedly in its different positions.

6. The combination of a rotary spindle, a reciprocating guide-driver, guide and guide-carrier, and a catch for connecting the carrier with the driver at different points, and means for reciprocating the driver and carrier to complete a cop-section while the carrier and driver are connected in each position.

7. The combination of a rotary spindle, the reciprocating guide driver, carrier, and guide carried thereby, catch for connecting the carrier and the driver at different points, means for reciprocating the driver and carrier while so connected to build up a cop-section, and means for putting the catch out of engagement after a cop-section has attained its desired diameter.

8. The combination in a cop-winding machine, of a rotary spindle, the guide, means for reciprocating the guide opposite the different parts of the spindle, and the devices for shifting the guide progressively from one position to another, to wind the cop in different sections.

9. The combination in a cop-winding machine, of a rotary spindle, guide, means for reciprocating the guide opposite different parts of the spindle, and devices for automatically shifting the guide progressively from one position to another to wind the cop in different sections.

10. The combination in a cop-winding machine, of a rotary spindle, guide, means for reciprocating the guide opposite different parts of the spindle, and devices arranged to operate as the cop-section attains its desired diameter, to shift the guide to a position opposite another part of the spindle to wind another cop-section.

11. In a winding-machine, the rotary spindle, the guide, the guide-carrying frame supported to move outward as the cop increases in size, means for reciprocating the guide opposite different parts of the spindle to wind the cop in successive sections, and means for shifting the guide to a different position upon the frame after each cop-section is completed.

12. In a winding-machine, the rotary spindle, guide, guide-carrying frame supported to move outward from the spindle as the cop increases in size, and means for reciprocating the guide upon the frame opposite different parts of the spindle to wind the cop in successive sections, a detent preventing the inward movement of the frame during the winding of any section, and means for mechanically acting on the detent to permit the frame to move inward toward the spindle after a cop-section has attained its desired diameter.

13. The combination with the spindle, guide, guide-supporting frame movable to carry the guide to and from the spindle, guide-driver and guide-carrier sliding on the frame, of a catch for connecting the two in different relative positions, means for mechanically operating the catch to disconnect the carrier and driver, and devices for actuating such means, when a cop-section has attained its desired diameter.

14. The combination in a winding-machine with a winding-spindle, a guide carried on an extensible, sectional traverse-bar, and devices for reciprocating the traverse-bar and its supported guide, of devices for extending said traverse-bar, comprising a lever adapted to be rocked to disengage the traverse-bar sections and to engage and shift the guide-carrying section longitudinally of the winding-spindle, a cam for rocking the lever and sliding it on its bearings to disengage and shift the guide-carrying section, and arranged with a central bearing to support the lever during the winding, and hold it from engagement with the working surfaces of the cam until the appropriate time for such engagement, a spring to throw the lever into such engagement, and a projection impelled by the spring to enter into engagement with the cam to disengage and shift the sections of the traverse-bar.

15. The combination with the swinging frame F, guide, guide-driver and guide-carrier, and catch for connecting the two, of the lever H having a projection for acting on the said catch, and means for actuating said lever to release the catch when a cop-section attains its proper diameter.

16. The combination in a winding-machine for winding sectional cops, of a winding-spindle, a traversing thread-guide, extensible devices for carrying said guide, and means to automatically extend said devices after the completion of one cop-section, to shift the position of the guide to wind another cop-section.

17. The combination in a winding-machine, of a winding-spindle, a reciprocating thread-guide, guide-driving devices, and means whereby the thread-guide is shifted upon the completion of one section of a cop, to wind a succeeding section adjacent thereto.

18. The combination in a winding-machine for winding sectional cops, of a winding-spindle, a cam, a reciprocating thread-guide, a sectional traverse-bar to carry the guide whereby the latter is driven from the cam to build a cop-section, and connections between the sections of the traverse-bar, whereby the latter may be extended to carry the guide opposite an independent part of the spindle to wind a different cop-section.

19. The combination in a winding-machine, of a winding-spindle, a cam, a reciprocating sectional traverse-bar driven by the cam, a thread-guide carried on the bar and adapted to maintain, during the winding, contact with the surface of the cop being wound, and connections between the sections of the traverse-bar adapted to be disengaged upon completion of one cop-section to permit the shifting of the thread-guide to wind a new cop-section adjacent to the one just previously wound.

20. The combination in a winding-machine of a winding-spindle, a cam, a reciprocating sectional traverse-bar driven by the cam, and adapted to be moved to and from the winding-spindle during the winding, a thread-guide carried on the reciprocating traverse-bar, connections between the sections of the traverse-bar and devices for disconnecting said sections to permit the extension of said bar, and the reconnection thereof, after said extension.

21. In a machine for winding sectional cops, a winding-spindle, a cam, an extensible traverse-bar reciprocated by the cam, a thread-guide supported on and carried by the traverse-bar and adapted to be pressed back from the winding-spindle with the increasing diameter of the cop-section being wound, a detent to prevent the return of the thread-guide to the spindle, and devices for releasing said detent at the completion of one cop-section to permit the return of the guide to the spindle to wind a new cop-section.

22. In a winding-machine comprising a winding-spindle, a cam, and a reciprocating thread-guide, the combination of a sectional extensible traverse-bar to carry the guide and driven by the cam, a spring-catch to connect the traverse-bar sections, with means whereby the said cam is caused to extend the traverse-bar.

23. In a winding-machine, a frame provided with bushings, a winding-spindle 9ª, a reciprocating guide i, a cam D supported on a cam-shaft 25 which is carried in the bushings, a guide-carrying frame supported on said bushings to swing concentrically with the cam-shaft from the winding-spindle with the increasing diameter of the cop-section being wound, a guide-carrier 67 supported to travel in suitable grooves in the swinging frame, a guide-driver 68 supported to travel in the same grooves, and to be reciprocated by the cam D, a connection 69 to join the guide-carrier to the guide-driver, and devices for mechanically disconnecting the guide-carrier from the guide-driver, to shift its position relative to the guide-driver, and to reconnect it again with the guide-driver, whereby a succession of cop-sections may be wound, one after and adjacent the other, substantially as described.

24. In a machine for winding sectional cops, a winding-spindle, a guide and carrier 67, devices to reciprocate the guide and carrier, a guide-driver 68, a spring-catch 69 for connecting the guide-driver 68 and carrier 67, and means for disengaging said catch and shifting the position of the guide, comprising a cam, a lever supported by suitable bearings with an arm adapted to press the spring-catch from engagement with the guide-carrier, and to engage the latter to shift its position, and with another arm to be acted upon by said cam to rock the latter to press the spring-catch from engagement with the guide-carrier and to then engage with the guide-carrier and shift its position longitudinally of the winding-spindle, and devices to insure that said engagement shall occur only at the appropriate time.

25. In a winding-machine, a winding-spindle, a reciprocating guide, a traverse-cam for driving the guide, a sectional traverse-bar, devices arranged to disconnect the sections of the bar and slightly move one section of the traverse-bar longitudinally while the other section is moved by the traverse-cam, and reconnected with the first section to extend the traverse-bar.

26. In a winding-machine, a winding-spindle, a reciprocating guide, a sectional traverse-bar for carrying the guide and susceptible of extension after the completion of a cop-section to wind another section adjacent the one just previously wound, and devices whereby, when the last winding on the spindle is completed, the traverse-bar can be readily contracted to its original length.

27. The combination in a winding-machine, having a winding-spindle, a reciprocating guide, a sectional, extensible traverse-bar, with a connection between the sections of the traverse-bar, and a traverse-frame, of a slide 80 carried in the frame, a plate 83 adapted to be pressed against the connection to disengage it, a recess in the traverse-frame, a projection 84 of the plate extending into the recess, and so adapted that when moved against the edge of said recess, it presses the plate 83 against the connection 69 disengaging the latter from the traverse-bar section, substantially as described.

28. The combination in a winding-machine for winding sectional cops, of a winding-spindle, a reciprocating thread-guide, a sectional, extensible traverse-bar, and means whereby when one section of a cop has been wound, the thread-guide is caused to cease its regular reciprocation and is advanced into position to wind the next cop-section while the spindle continues its rotation, winding several coils about the spindle before commencing to wind the new section, substantially as described.

29. The combination in a winding-machine, of a winding-spindle, a thread-guide, a sectional, extensible traverse-bar, a cam for disconnecting the sections of the traverse-bar and shifting one of the sections, and a traverse-cam to reciprocate the traverse-bar, and when the sections thereof are disconnected, to extend the same.

30. In a winding-machine, the combination of a winding-spindle, a reciprocating guide, an extensible, sectional traverse-bar, a frame movable to and from the spindle to carry and guide the traverse-bar, and devices for extending the traverse-bar comprising a lever mounted on said frame, to move both rotatively and longitudinally, a projection carried at one extremity of the lever, a slot in said frame through which the projection is pushed to disengage the sections of the traverse-bar, and along which it is moved to partially extend said sections, a cam to operate through the lever to disengage and partially extend the sections of the traverse-bar, and a spring between the lever and the frame to nominally withhold the projection from the traverse-bar and, after the extension thereof, to return said projection to its normal position.

31. The combination in a winding-machine, of a winding-spindle, a reciprocating guide and guide-actuating devices, a traverse-bar to support the guide consisting of a thin blade with lateral projections to prevent vertical displacement of the traverse-bar, provision to connect with the actuating devices, and a recess of dovetail section to receive and hold the thread-guide.

32. The combination of the frame F, catch, guide, guide-carrier, guide-driver, the lever H for disengaging said catch, cam K to operate the lever, having a central antifriction-bearing, a block carried by the lever H and adapted to be supported by said bearing during the winding of each section, and means for swinging the lever H to carry the block from said bearing when a cop-section is completed, to engage with the cam K, to cause the disconnecting of the guide driver and carrier, substantially as indicated.

33. The combination of the frame F, its detent, the reciprocating guide, guide carrier and driver, and catch for connecting the two, the lever H for operating said catch, and means for shifting the position of the detent on a change of position of the lever H, for the purpose set forth.

34. The combination in a cop-winding machine, of a rotary spindle, the swinging frame movable on its axis to and from said spindle, and a guide-carrier supported by said frame to move in a path at an angle to the axis of said frame.

35. The combination in a cop-winding machine, of a rotary spindle, a frame movable to and from said spindle, and a guide-carrier supported to be moved on said frame in a path inclined to the axis of the spindle and to the direction of movement of the frame.

36. In a winding-machine, a winding-spindle, a cam, a reciprocating guide, a guide-carrying frame supported to swing concentrically with the axis of the cam, and a guide-carrier supported to be driven by the cam in a channel cut in said frame at an angle with the axis of the cam.

37. In a winding-machine, a winding-spindle, a reciprocating guide, a guide-carrying frame movable to and from the winding-spindle, a detent to prevent the return of the frame toward the spindle, and a handle and connections whereby on pressing said handle toward the spindle, the detent shall be released, and the frame returned toward the spindle.

38. In a winding-machine, the combination of a winding-spindle, a reciprocating guide, a guide-carrying frame movable to and from the winding-spindle, a detent to prevent the return of the frame toward the spindle, and devices for releasing said detent comprising a rod carried in suitable bearings on the swinging frame, connections between one end of said rod and the detent, and a handle at the opposite end of the rod and in such position relative to the traverse-frame that a pressure on said handle toward the spindle shall release the detent and return the traverse-frame toward the winding-spindle.

39. In a winding-machine, the combination of a winding-spindle, a reciprocating guide and a traverse-frame movable to and from the spindle, of an arc Q free to swing on the supporting-stud 73 on the main frame of the machine, a bearing 75 on the swinging frame, a detent R also carried on the swinging frame and bearing on the arc Q to restrain the frame F from moving in one direction, a rod 74 carried in bearings on the swinging frame, connections 77, 78 and 79 between said rod and detent, and a handle 76 to release said detent, substantially as described.

40. The combination in a winding-machine, of a winding-spindle, a reciprocating guide, a guide driver and carrier, and means for shifting the carrier with respect to the driver, and a frame in which the carrier and driver are reciprocated, movable with the guide to and from the winding-spindle, stopping devices to arrest the winding provided with a screw 7, a sliding blade 80 with which the guide-carrier is adapted to make contact after the latter has been shifted, to so move the blade 80 that a portion thereof is opposite the screw 7 to engage therewith when the frame is moved back from the spindle, substantially as described.

41. In a winding-machine, the combination with a winding-spindle, reciprocating guide, extensible sectional traverse-bar, means for extending the traverse-bar, and a movable frame to support and direct the traverse-bar, of means for disconnecting the sections of the traverse-bar after extension comprising a slide 80, devices carried at one end of the slide, and operated by a longitudinal movement thereof to disengage the traverse-bar sections, an arm $81^a$ pivotally mounted at the opposite extremity of the slide to engage the projection $67^a$ on the traverse-bar when the latter is extended, a pin 86 carried in said frame and pressed by the spring 87 to hold the arm $81^a$ down, and in line with the projection $67^a$, and to force the slide 80 outward from the frame A to bring the opening therein opposite the screw 7 and an appropriate member $81^b$ whereby, when the slide 80 is shifted to disconnect the traverse-bar sections, the arm $81^a$ may be lifted to clear the projection $67^a$, substantially as described.

42. The combination in a winding-machine with a winding-spindle, a reciprocating guide, an extensible traverse-bar, movable supporting-frame therefor, and devices for arresting the winding comprising the projection 7, of the projection $57^a$ on the traverse-bar, the slide 80 carried on said frame behind the traverse-bar, the pivoted member 81 with the arm $81^a$ to be struck by the projection $67^a$ to so shift the slide 80 when the traverse-bar is extended, that a portion of said slide is moved into position opposite the projection 7, and, when the traverse-bar is to be contracted, to be raised to clear the projection 67ª, substantially as described.

43. The combination of the frame F, guide-carrier and guide-driver and catch for connecting the same, the blade 80, a plate 83 and projection carried thereby, and a shoulder on the frame F arranged to be engaged by said projection to thereby push out the plate 83 and disconnect the guide-driver from the guide-carrier when the blade 80 is moved inward, substantially as set forth.

44. The combination in a winding-machine with a winding-spindle, a guide carried by a sectional, extensible traverse-bar, and devices for reciprocating the traverse-bar and the guide, and stopping devices to arrest the winding, of devices for extending the traverse-bar comprising a lever supported on suitable bearings and susceptible of being rocked to disengage the traverse-bar sections, and moved longitudinally of its bearings to shift the position of the guide-carrying section, a cam to both rock the lever and slide it on its bearings, having a central bearing to support the aforesaid lever when out of engagement with the cam during the winding of a cop-section, a projection to engage said lever to swing it outward from said central bearing, and a spring to shift the lever into active engagement with the cam, and connections between said projection and the stopping devices of the machine whereby the position of the projection is so changed when the winding is stopped that it cannot engage with the lever, to then cause the disengagement and shifting of the traverse-bar section.

45. An extensible traverse-bar for a winding-machine comprising two sections of sheet metal, both adapted to slide in a common channel in a suitable frame, and each formed with ears or guides adapted to a second channel at right angles to the first to prevent upward movement of the sections, one section provided with a socket of dovetail section to receive the thread-guide, and with vertical slots in the face of the section, and the other section fitted with a spring-catch adapted to engage any one of said slots to elongate or shorten the traverse-bar, substantially as described.

46. An extensible traverse-bar for a winding-machine comprising two sections of sheet metal, both adapted to slide in a common channel in a suitable frame, each formed with ears or guides adapted to a second channel at right angles to the first to prevent vertical displacement of the sections, one section adapted to receive a thread-guide of appropriate form and the other adapted to connect with the devices for reciprocating the thread-guide, a spring-catch to join the two sections and attached to one of them, the other being provided, at a plurality of points, with means to engage said catch to elongate or contract the traverse-bar.

47. The combination in a cop-winding machine, of a main frame, rotary shaft 9, guide, cam D actuating the guide and shaft 25 carrying said cam, clutch-wheels upon the shaft 9 and cam-shaft 25, beveled-edge disks on said shafts for actuating movable clutches for engaging the clutch-wheels, levers T T' pivoted to the frame with ends for engaging said disks and with opposed forked extremities, and roll 34, movable between said forked extremities to carry the levers into and out of engagement with the disks, substantially as set forth.

48. The combination of the shafts 9 and 25, the clutch-wheels upon said shafts, each with a movable clutch 13 and beveled-edge disks, $13^\times$, levers T T', with ends for engaging the disks $13^\times$, and means for simultaneously swinging the said levers into and out of engagement with said disks, substantially as set forth.

49. The combination in a winding-machine, of a main frame, winding-shaft, reciprocating guide, cam for driving the guide, and shaft carrying the cam, clutch-wheels rotatable on said winding-shaft and cam-shaft, clutches carried on and rotatable with the winding-shaft and cam-shaft, levers T T' pivoted to the frame and with extremities adapted to engage the clutches to withdraw them from the clutch-wheels and arrest the rotation of winding-shaft and cam-shaft, and having opposed forked extremities and a pin 34 between said extremities to move both levers coincidently into or out of engagement with their respective clutches, substantially as described.

50. In a machine for winding sectional cops, a winding-spindle, a cam, an extensible traverse-bar reciprocated by the cam, devices for extending the traverse-bar, a thread-guide carried by the traverse-bar and adapted to bear at all times during the winding against the surface of the cop-section being wound, and devices whereby the relative speed of the spindle and thread-guide can be adjusted to regulate the distance between adjacent helices of the material wound.

51. The combination in a winding-machine, with a winding-shaft, and a reciprocating guide, of devices to start and arrest the winding comprising a clutch-wheel rotatable on the winding-shaft, a clutch movable longitudinally on the winding-shaft, and rotatable therewith and having a disk portion with an edge of substantially triangular form, a spring 15 to press the clutch into engagement with its clutch-wheel, and lever with extremity fitted to said triangular edge and so related thereto that when thrown into engagement therewith the clutch is withdrawn from the clutch-wheel, and its rotation arrested by the friction of the lever on the triangular edge of the clutch.

52. The combination with a plurality of winding-machines, and shafts 9 and 25 in each machine to operate its winding mechanism, of shafts N and U operatively connected with the shafts 9 and 25, and a gainer mechanism intermediate the shafts N and U to drive and control the machines through said shafts N and U in the manner substantially as set forth.

53. The combination with the shafts N and U and single gainer mechanism and driving means, of a plurality of winding-machines arranged in pairs opposite each other and having shafts 9 and 25 with gearing whereby all of said shafts are turned from the shafts N and U, substantially as set forth.

54. The combination with a machine-bed, and two rows of winding-machines mounted on said bed each having shafts 9 and 25, of two driving-shafts N and U extending between the opposed rows of machines and connected with the shaft 9 and shaft 25 by bevel-gearing and variable-speed devices interposed between said driving-shafts, whereby the relative speeds of the shaft 9 and shaft 25 may be adjusted, substantially as described.

55. The combination with a plurality of winding-machines mounted on a common bed in opposed rows, of driving-shafts N and U extending between said rows of machines, a shaft 10 connected with the shaft N by suitable gearing, and carrying the driving-pulley p and expansible pulley L, a frame g carried on the shaft U and free to swing thereon, a pinion 23 carried on the shaft O in suitable bearings in said swinging frame, and pulley L' at the outer end of said shaft connected with the pulley L by the belt l, substantially as described.

56. The combination in a winding-machine, of a winding-spindle, a traverse-bar, devices for reciprocating the traverse-bar, and a guide carried by said traverse-bar, consisting of a body of dovetail section, and with the upper extremity adapted to receive the thread.

57. The combination in a winding-machine, of a winding-spindle, a traverse-bar, and devices for reciprocating the traverse-bar, a guide carried by the traverse-bar, having a lower portion of dovetail section to fit the traverse-bar, a thin upper portion bent outward, and an eye to receive the thread.

58. The combination in a winding-machine, of a winding-spindle, a traverse-bar, and devices for reciprocating the traverse-bar, a guide carried by the traverse-bar having a lower portion fitted to the traverse-bar, a thin upper portion bent outward, an eye to receive the thread, and a lateral opening whereby the thread is introduced into the eye.

In testimony whereof I have signed my name to this specification in the presence of two subscribing witnesses.

SIMON W. WARDWELL.

Witnesses:
EDWIN C. SMITH,
JOSHUA B. HALE.